United States Patent
Youn

(10) Patent No.: US 7,433,284 B2
(45) Date of Patent: Oct. 7, 2008

(54) METHOD FOR CONTROLLING TILT SERVO IN OPTICAL DISC DEVICE

(75) Inventor: Jeong Chae Youn, Pyungtaek-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 491 days.

(21) Appl. No.: 10/986,224

(22) Filed: Nov. 12, 2004

(65) Prior Publication Data

US 2005/0105413 A1      May 19, 2005

(30) Foreign Application Priority Data

Nov. 14, 2003      (KR)      ............... 10-2003-0080394

(51) Int. Cl.
*G11B 7/00*      (2006.01)
(52) U.S. Cl. ............... 369/53.19; 369/44.32
(58) Field of Classification Search ............... None
See application file for complete search history.

(56) References Cited

U.S. PATENT DOCUMENTS

| 6,473,389 | B2 * | 10/2002 | Hirai et al. ............... 720/682 |
| 6,842,414 | B1 | 1/2005 | Park et al. |
| 6,963,520 | B1 * | 11/2005 | Park et al. ............... 369/44.11 |
| 7,154,831 | B2 * | 12/2006 | Yanagawa et al. ......... 369/53.19 |
| 2003/0147314 | A1 | 8/2003 | Kondo et al. |
| 2003/0174600 | A1 | 9/2003 | Yoshimoto |

FOREIGN PATENT DOCUMENTS

| CN | 1264113 A | 8/2000 |
| CN | 1506951 A | 6/2004 |
| JP | 10-188314 A | 7/1998 |
| KR | 2000-007297 A | 12/2000 |

* cited by examiner

*Primary Examiner*—Wayne Young
*Assistant Examiner*—Adam R Giesy
(74) *Attorney, Agent, or Firm*—Birch, Stewart, Kolasch & Birch, LLP

(57) ABSTRACT

A method for controlling a tilt servo in an optical disc device is provided. The method includes (a) detecting a specific signal associated with a focus servo, and (b) generating a tilt servo control signal for an objective lens according to a variation amount of the specific signal.

8 Claims, 6 Drawing Sheets

Offset variation

METHOD FOR CONTROLLING TILT SERVO IN OPTICAL DISC DEVICE

This application claims the benefit of Korean Patent Application No. 10-2003-80394 filed Nov. 14, 2003, the entire contents of which are herein fully incorporated by reference.

BACKGROUND OF THE INVENTION

1. Field of the Invention

The present invention relates to a method for controlling a tilt servo in an optical disc device, and more particularly to an optical disc device and a method for correcting a tilt of an optical disc using a focus error signal and a focus drive signal.

2. Description of the Related Art

Recently, optical discs capable of storing digital video and audio data, for example, digital versatile discs (DVDs) or compact discs (CDs), are widely supplied. Moreover, optical disc devices equipped with an optical pickup for reproducing or recording data on optical discs have been commercialized.

An optical pickup provided in an optical disc device comprises an objective lens 11, a beam splitter 12, a photo detector (PD) 13, a laser diode (LD), as shown in FIG. 1.

In a process for manufacturing the optical disc device, a base on which the optical pickup is mounted is finely adjusted so that the objective lens 11 of the optical pickup is parallel with a skew-free optical disc 10 loaded into the optical disc device.

This is to prevent playback or recording performance from being degraded when the objective lens 11 and the optical disc 10 are not parallel to each other. Thus, the base is finely adjusted in tangential and radial directions on the basis of the skew-free optical disc 10. This fine adjustment is referred to as the tilt or skew adjustment.

As shown in FIG. 2, the optical disc device of FIG. 1 also comprises an LD driver 15, a focus error (F.E.) detector 16, a microcomputer (Micom) 17, a focus drive 18, a servo 19, a memory 20, etc.

The F.E. detector 16 carries out a mathematical operation on electrical signals outputted from the photo detector 13 included in the optical pickup, for example, a 4-element photo detector divided into A, B, C and D areas, and then detects a focus error signal (F.E.=(A+C)−(B+D)).

In order to bring the value of the focus error signal down to zero, the microcomputer 17 generates and outputs a focus control signal based on the focus error signal. The servo 19 generates a focus drive signal corresponding to the focus control signal and then outputs the generated focus drive signal to the focus drive 18.

The focus drive 18 applies, to a focus actuator coil (not shown) of the optical pickup, focus drive current corresponding to the focus drive signal. Through this operation, a focus servo operation is performed to vertically shift the objective lens 11 so that a detected focus error can be reduced.

Meanwhile, where a skew is present in the optical disc inserted into the optical disc device, for example, where the optical disc is bent in the outward direction (or the skew is present in the radial direction), the optical disc device operates in a state in which the optical disc and the objective lens of the optical pickup are not positioned parallel to each other while being at a tilt. Thus, the performance of the focus servo or a tracking servo is degraded and hence the performance of a playback or recording operation is degraded. This phenomenon is called a tilt error.

In order for the tilt error to be corrected, jitter characteristics of a radio frequency (RF) outputted from a photo detector (PD) must be measured to calculate a tilt degree between the optical disc and the objective lens of the optical pickup. Alternatively, the tilt degree must be measured by a special tilt sensor. That is, an expensive jitter measurement circuit or a tilt sensor occupying a large space is required and used to correct the skew of the optical disc. However, this increases the size and price of the optical disc device, which is a problem.

SUMMARY OF THE INVENTION

Therefore, the present invention has been made in view of the above and other problems, and it is one object of the present invention to provide an improved method for correcting a tilt error in an optical disc device.

It is another object of the present invention to provide an optical disc device and a method of correcting a tilt error in an optical disc device, which overcome the problems and limitations associated with the related art.

It is another object of the present invention to provide a method capable of easily measuring a tilt degree between an optical disc inserted into an optical disc device and an objective lens.

In accordance with an aspect of the present invention, the above and other objects can be accomplished by the provision of a method for controlling a tilt servo in an optical disc device, comprising the steps of: (a) detecting a specific signal associated with a focus servo; and (b) generating a tilt servo control signal for an objective lens according to a variation amount of the specific signal.

According to an aspect of the present invention, the specific signal is a focus error signal or a focus drive signal, and an offset signal based on the focus error signal or the focus drive signal is used. The specific signal may be detected in predetermined section units, and the variation amount of the specific signal is calculated. The tilt servo control signal corresponding to the variation amount of the specific signal may be stored in a memory in advance.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFFERRED EMBODIMENTS

Now, an optical disc device and a method for controlling a tilt servo in the optical disc device in accordance with preferred embodiments of the present invention will be described in detail with reference to the annexed drawings.

Figure 1:
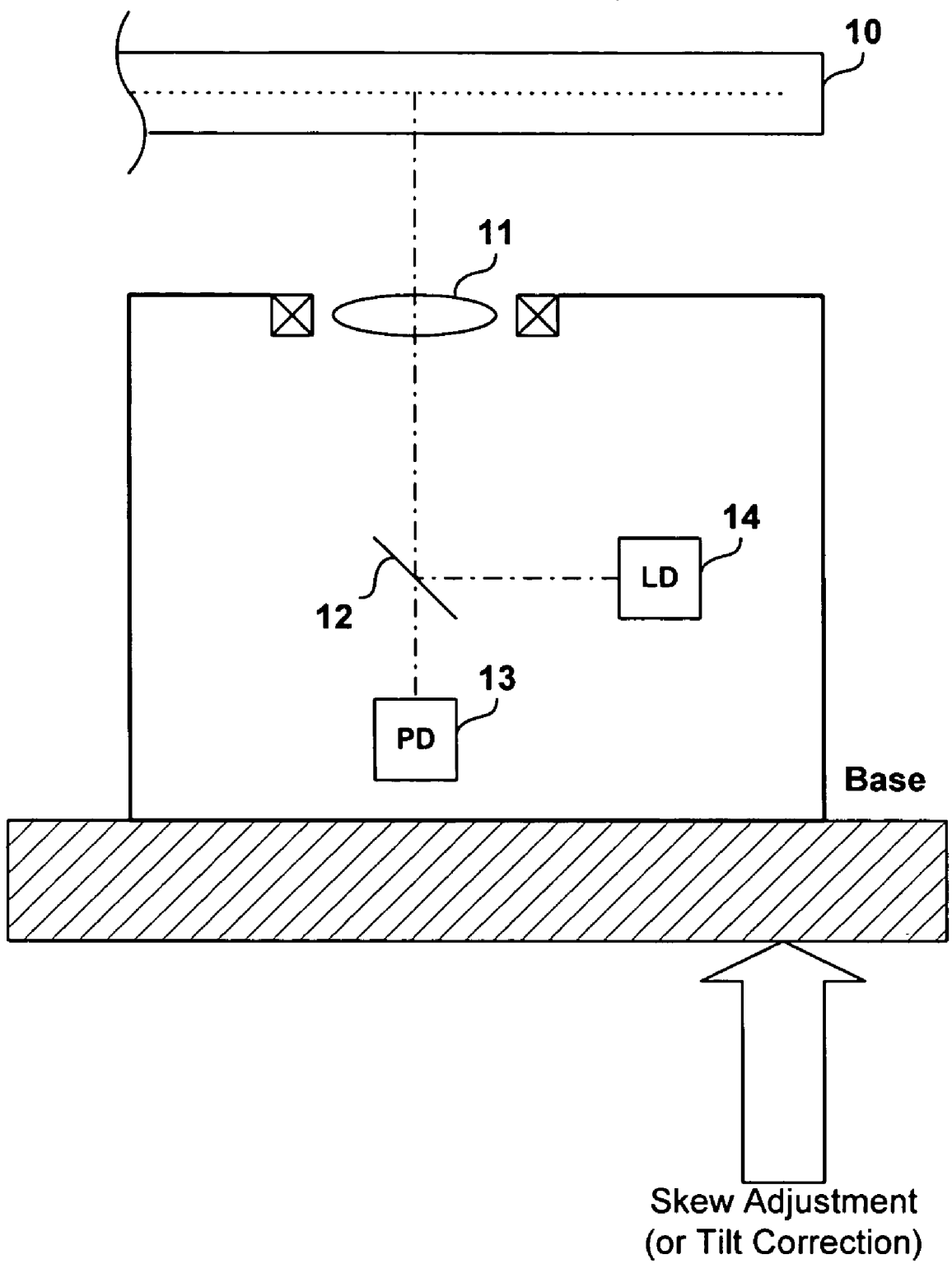
FIG. 1 is an explanatory view illustrating an example of physically adjusting a tilt of an optical pickup in a process for manufacturing an optical disc device according to a related art.
Figure 2:
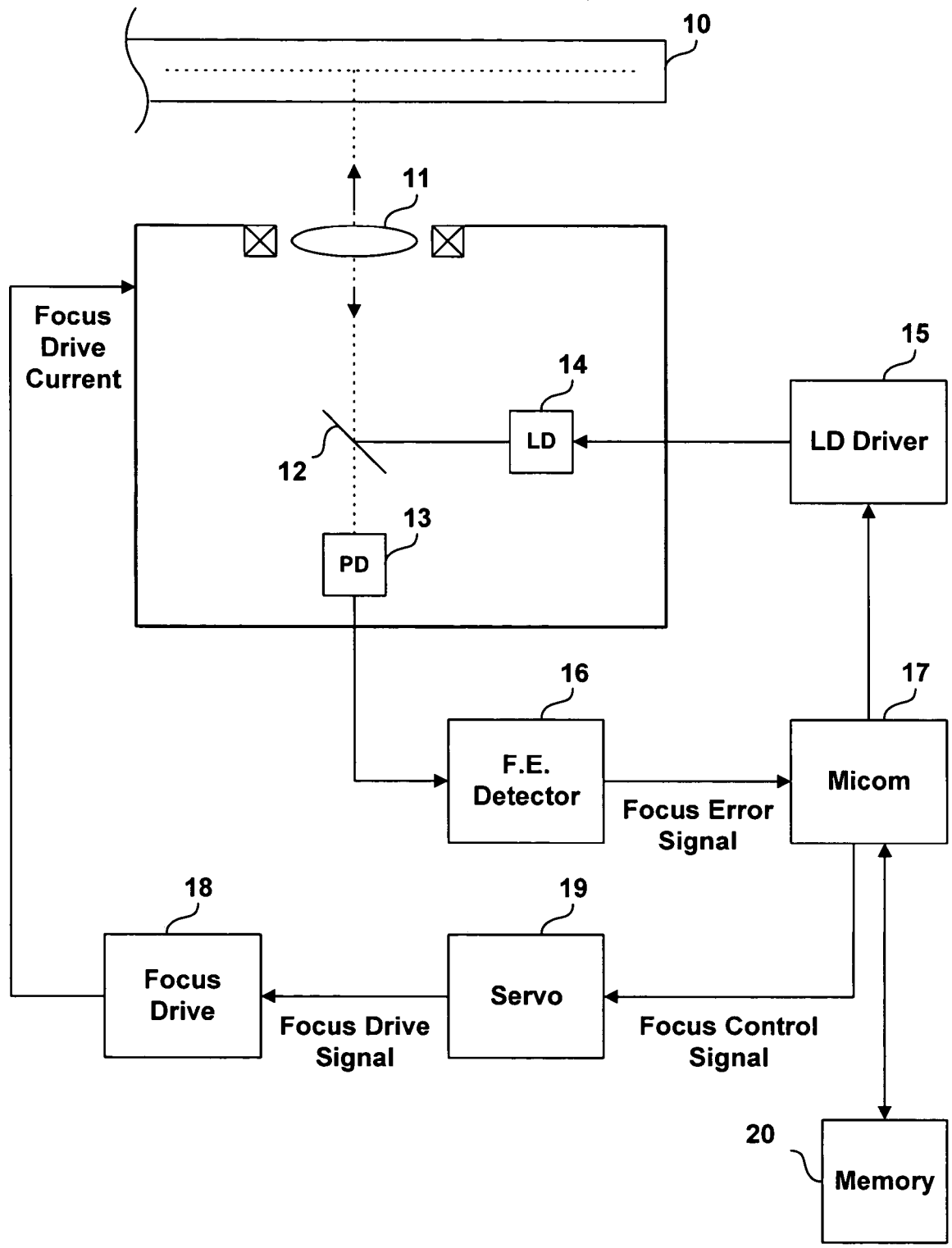
FIG. 2 is a block diagram illustrating a configuration of the optical disc device of FIG. 1.
Figure 3:
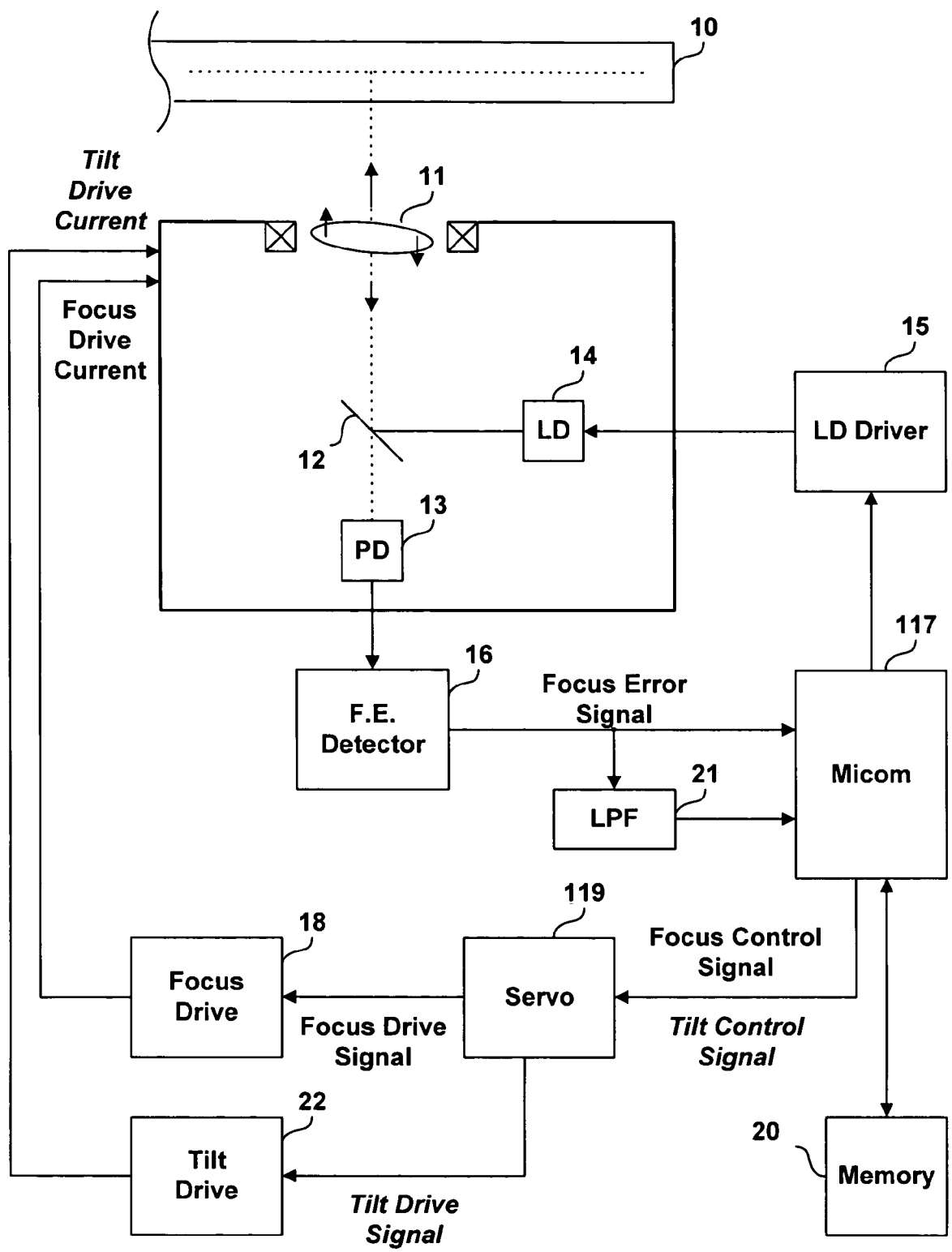
FIG. 3 is a block diagram illustrating the configuration of an optical disc device to which a method for controlling a tilt servo is applied in accordance with one embodiment of the present invention.

FIG. 3 is a block diagram illustrating the configuration of an optical disc device to which a method for controlling a tilt servo is applied in accordance with one embodiment of the present invention. Referring to FIG. 3, the optical disc device comprises an optical pickup including an objective lens 11, a beam splitter 12, a photo detector (PD) 13, a laser diode (LD), etc. Further, the optical disc device comprises an LD driver 15, a focus error (F.E.) detector 16, a microcomputer (Micom) 117, a focus drive 18, a servo 119, a memory 20, a low pass filter (LPF) 21 and a tilt drive 22. All the components of the optical disc device are operatively coupled. The focus servo operation in FIG. 1 is also performed in the device of FIG. 3 and thus the description thereof is omitted.

Only a low frequency component of a focus error signal outputted from the F.E. detector 16 is inputted to the microcomputer 117 through the LPF 21. The microcomputer 117 then generates and outputs a tilt control signal for correcting a tilt error of the objective lens 11 according to a value of the low frequency component of the focus error signal outputted from the LPF 21.

The servo 119 generates a tilt drive signal corresponding to the tilt control signal from the microcomputer 117 and then outputs the generated tilt drive signal to the tilt drive 22. The tilt drive 22 applies, to a tilt actuator coil provided in the optical pickup, the tilt drive current corresponding to the tilt drive signal, such that a tilt servo operation is performed for the objective lens 11. This operation will now be described in more detail referring to FIG. 4.

Figure 4:
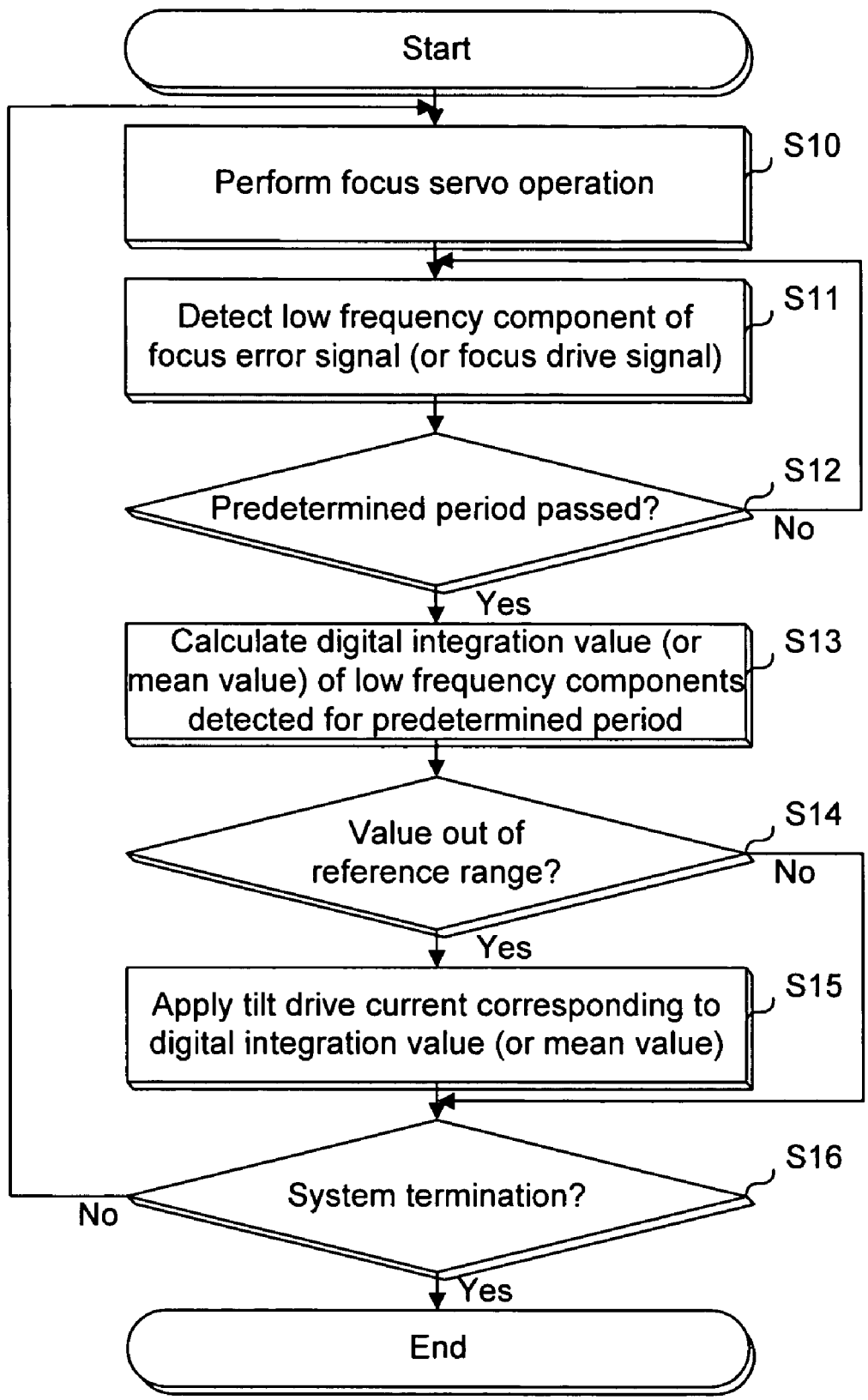
FIG. 4 is a flowchart illustrating the method for controlling the tilt servo in the optical disc device in accordance with the present invention.

FIG. 4 is a flowchart illustrating the method for controlling the tilt servo of the optical disc device in accordance with the present invention. Although the method of FIG. 4 is applicable to the optical disc device of FIG. 3, it is not limited to it and can be applied to other suitable devices/systems.

When a typical focus servo operation is performed in the optical disc device (S10), the F.E. detector 16 outputs a focus error signal based on a focus error detected thereby, and the LPF 21 filters the focus error signal and then outputs the filtered focus error signal to the microcomputer 117. The filtered focus error signal has only a low frequency component.

The microcomputer 117 detects a value of the low frequency component of the focus error signal outputted from the LPF 21 (S11). The microcomputer 117 detects the low frequency component value of the focus error signal for a predetermined period because the focus error signal is not constant due to random noise, characteristics of focus feedback servo, etc. (S12).

When the predetermined period has passed (S12), the microcomputer 117 accumulates or integrates all the low frequency component values detected during the predetermined period to calculate a digital integration value or a mean value between digital integration values (S13).

Subsequently, the microcomputer 117 compares the calculated digital integration value or the mean value with reference values within a tolerant range of a tilt error. The reference values are preset values obtained based on a result of experimentation in a process for manufacturing the optical disc device. The reference values can be stored in the memory 20.

If it is determined that the calculated digital integration value or the calculated mean value exceeds or falls outside the reference range as a result of the comparison (S14), the microcomputer 117 generates and outputs a tilt control signal corresponding to the digital integration value or the mean value. The servo 119 generates a tilt drive signal corresponding to the tilt control signal output from the microcomputer 117 and outputs the generated tilt drive signal to the tilt drive 22. The tilt drive 22 applies, to the tilt actuator coil provided in the optical pickup, tilt drive current corresponding to the tilt drive signal to move the objective lens accordingly (S15). Through this operation, a tilt servo operation is performed to vertically shift inward and outward sides of the objective lens 11 in directions opposite to each other, respectively.

This tilt servo operation is continuously repeated until a recording or playback operation of the optical disc device is terminated (S16). Only after a value of the low frequency component of the focus error signal filtered by the LPF 21 exceeds the preset reference range, the microcomputer 117 may enable the tilt servo operation for correcting the tilt error to be immediately performed according to the present invention.

Figure 5:
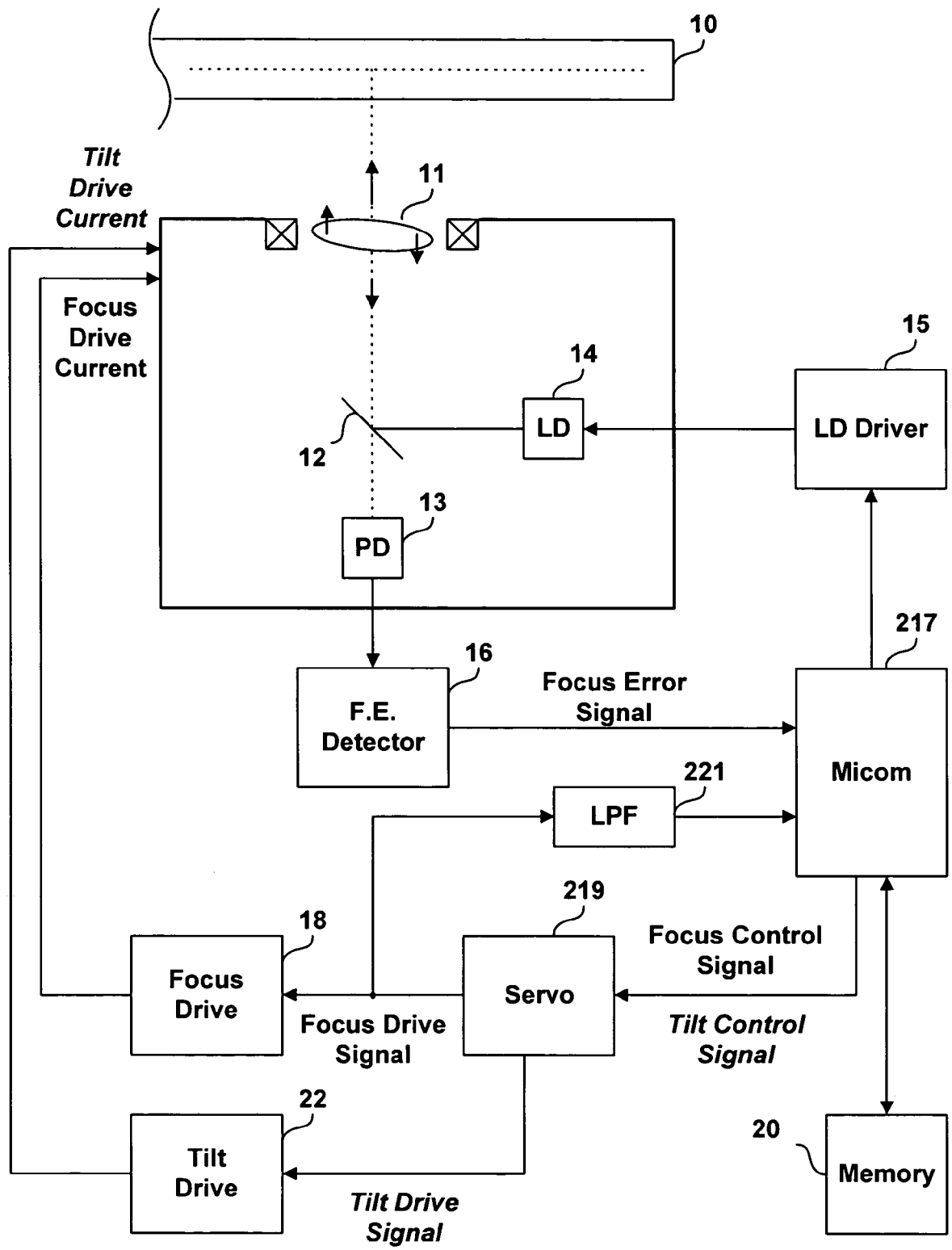
FIG. 5 is a block diagram illustrating the configuration of an optical disc device to which a method for controlling a tilt servo in the optical disc device is applied in accordance with another embodiment of the present invention.

FIG. 5 is a block diagram illustrating the configuration of an optical disc device to which a method for controlling a tilt servo in the optical disc device is applied in accordance with another embodiment of the present invention. The optical disc device shown in FIG. 5 is similar to that shown in FIG. 3. However, the optical disc device shown in FIG. 5 filters using a LPF 221 a focus drive signal detected and output from a servo 219 and then outputs the filtered focus drive signal to a microcomputer 217. This differs from the optical disc device shown in FIG. 3 filtering a focus error signal detected from the F.E. detector 16. The microcomputer 217 receives the low frequency components of the focus drive signal for a predetermined time period and generates a tilt control signal based on the low frequency components. The servo 219 receives the tilt control signal and then generates and outputs a tilt drive signal accordingly to the tilt drive 22, which in turn moves the objective lens 11. In other words, in this embodiment, the method steps of FIG. 4 are performed using the low frequency components of a focus drive signal (see S11 in FIG. 4), and not based on a focus error signal as in the device of FIG. 3.

Figure 6:
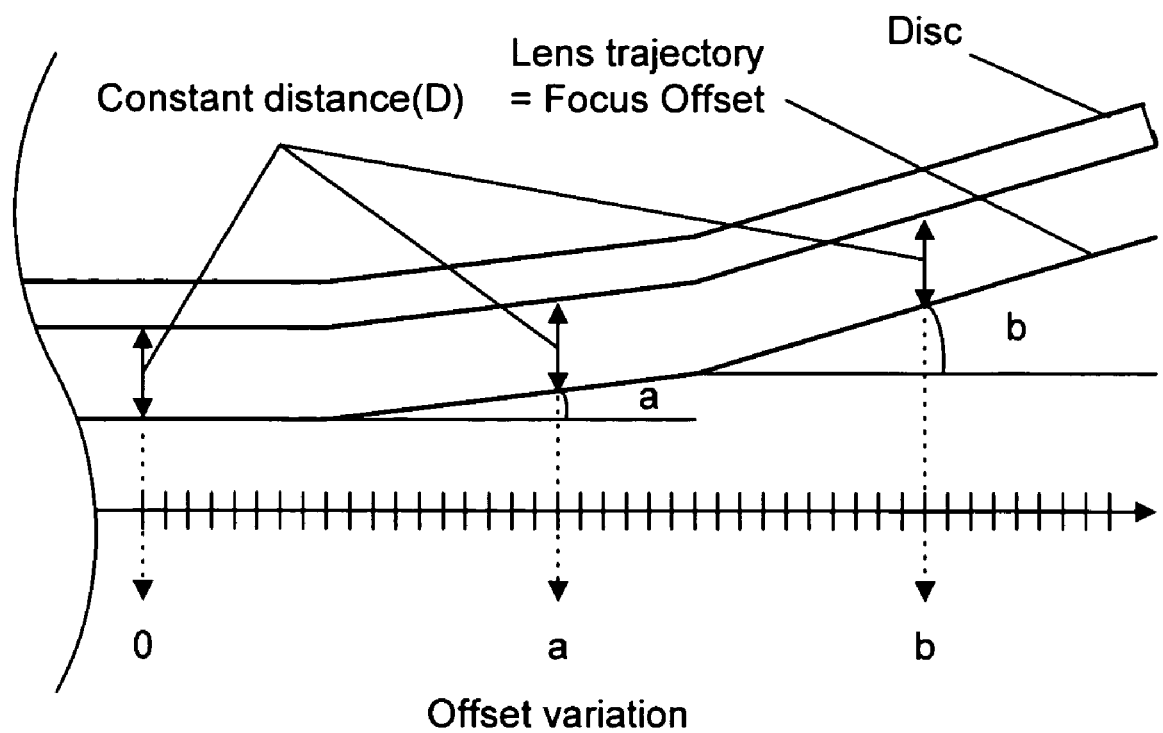
FIG. 6 is an explanatory view illustrating a relationship between optical disc bending and a focus offset causing a tilt error according to another embodiment of the present invention.

In accordance with another embodiment of the present invention, a tilt servo operation is performed on the basis of a focus offset variation. As shown in FIG. 6, an optical disc is divided into a plurality of sections in an outward direction. A focus offset measured in each section of the disc is compared with that measured in its neighbor section, such that the focus offset variation is calculated. A tilt control signal is then generated on the basis of the calculated focus offset variation, such that the tilt servo operation can be performed to drive a tilt actuator in response to the generated tilt control signal. This method can be implemented in the optical disc device of FIG. 3 modified to detect the focus offset variation.

For reference, the focus offset is a value necessary for driving the actuator of the objective lens so that the detected focus error signal is brought to zero. Furthermore, the focus offset corresponds to a direct current (DC) or low frequency value of the focus error or drive signal. As shown in FIG. 6, because a predetermined constant distance (D) is maintained between the objective lens and a recording surface of the optical disc by the focus drive signal even if the optical disc is bent or deformed, the focus offset value reflects a form/bent shape or degree of the optical disc and more particularly a form in which the optical disc is generally bent from the inner circumference to the outer circumference.

As apparent from the above-described present invention, a tilt degree can be easily measured without using expensive tilt measurement equipment or an expensive correction circuit.

Furthermore, a tilt error is corrected by a simple method, such that performance of a focus servo or a tracking servo can be improved greatly and thus performance of a playback or recording operation for an optical disc can be improved greatly.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a tilt servo in an optical disc device, comprising:
   detecting one of a focus error signal and a focus drive signal;
   performing a low pass filtering operation on the detected one of the focus error signal and the focus drive signal so as to detect a low frequency component signal of the detected signal; and
   generating a tilt servo control signal for an objective lens included in the optical disc device based on only the low frequency component signal,
   wherein the generating step includes
      calculating an integrated value or a mean value of the detected low frequency component signal; and
      generating the tilt servo control signal for the objective lens if the integrated value or the mean value falls outside a preset range.

2. The method of claim 1, further comprising:
   dividing an optical disc included in the optical disc device into a plurality of sections in an outward direction;
   measuring a focus offset in each section; and
   comparing the focus offset in each section with focus offsets in neighboring sections to determine the focus error signal.

3. The method of claim 1, further comprising: storing the tilt servo control signal in a memory.

4. The method of claim 1, wherein the low pass filtering operation is performed for a predetermined period so as to detect a plurality of low frequency components.

5. An optical disc device, comprising:
   a focus error detector configured to detect one of a focus error signal and a focus drive signal;
   a low pass filter configured to perform a low pass filtering operation on the detected one of the focus error signal and the focus drive signal so as to detect a low frequency component signal of the detected signal; and
   a controller configured to generate a tilt servo control signal for an objective lens included in the optical disc device based on only the low frequency component signal,
   wherein the controller calculates an integrated value or a mean value of the detected low frequency component signal, and generates the tilt servo control signal for the objective lens if the integrated value or the mean value falls outside a preset range.

6. The optical disc device of claim 5, wherein the controller is further configured to divide an optical disc included in the optical disc device into a plurality of sections in an outward direction, to measure a focus offset in each section, and to compare the focus offset in each section with focus offsets neighboring sections to determine the focus error signal.

7. The optical disc device of claim 5, further comprising: a memory configured to store the tilt servo control signal.

8. The optical disc device of claim 5, wherein the low pass filtering operation is performed for a predetermined period so as to detect a plurality of low frequency components.

* * * * *